United States Patent
Ashiba et al.

(10) Patent No.: US 6,622,832 B2
(45) Date of Patent: Sep. 23, 2003

(54) HYDRAULIC SHOCK ABSORBER

(75) Inventors: Masahiro Ashiba, Kanagawa-ken (JP); Takashi Ichikawa, Tokyo (JP)

(73) Assignee: Tokico Ltd., Kanagawa-ken (JP)

( * ) Notice: Subject to any disclaimer, the term of this patent is extended or adjusted under 35 U.S.C. 154(b) by 0 days.

(21) Appl. No.: 09/840,828

(22) Filed: Apr. 25, 2001

(65) Prior Publication Data

US 2002/0063024 A1 May 30, 2002

(30) Foreign Application Priority Data

Apr. 28, 2000 (JP) .......................... 2000-130145

(51) Int. Cl.$^7$ .................................................. F16F 9/36
(52) U.S. Cl. ..................... 188/322.17; 92/168; 188/315; 188/318; 188/322.13; 277/500
(58) Field of Search ........................ 188/322.17, 322.16, 188/322.18, 315, 318, 322.13, 289; 277/500, 574, 565, 552, 549, 563, 387, 572, 353, 573, 928, 568; 92/168, 165 R; 267/120, 124, 127, 129; 137/853

(56) References Cited

U.S. PATENT DOCUMENTS

| | | | |
|---|---|---|---|
| 3,621,952 A | * | 11/1971 | Long, Jr. et al. |
| 4,055,352 A | * | 10/1977 | Allinquant et al. |
| 4,189,033 A | * | 2/1980 | Katsumori |
| 4,245,825 A | * | 1/1981 | Ohtomo et al. ............. 188/315 |
| 4,508,020 A | * | 4/1985 | Szcupak |
| 4,542,811 A | * | 9/1985 | Miura |
| 4,653,618 A | * | 3/1987 | Churchill et al. |
| 5,176,229 A | * | 1/1993 | Kanari et al. |
| 5,224,573 A | * | 7/1993 | Amemiya et al. |
| 5,509,514 A | * | 4/1996 | Allen et al. |
| 5,638,927 A | * | 6/1997 | Cheatham et al. |

FOREIGN PATENT DOCUMENTS

| | | | |
|---|---|---|---|
| JP | 9137870 | * | 5/1997 |
| JP | 11132338 | * | 5/1999 |

OTHER PUBLICATIONS

Translation of JP 9–137870 from STIC Translations Branch.*

* cited by examiner

Primary Examiner—Douglas C. Butler
(74) Attorney, Agent, or Firm—Wenderoth, Lind & Ponack, L.L.P.

(57) ABSTRACT

A rod guide is press-fitted to an inner periphery of an outer cylinder and to an inner periphery of an inner cylinder. A rod seal is provided at an inner periphery of a cover member for covering the outer cylinder to seal between a piston rod and the cover member. Space between the rod seal and the rod guide is formed as a hydraulic fluid reservoir chamber. Further, a lip seal is integrally formed on an outer periphery of the rod seal. The lip seal is set so as to separably abut a valve seat surface of the rod guide. One side surface of the lip seal is provided with a plurality of radially extending hydraulic fluid grooves spaced from each other in a circumferential direction. With this arrangement, a valve opening pressure of the lip seal can be kept small regardless of size of interference of the lip seal. Thus, air removability is improved.

18 Claims, 6 Drawing Sheets

HYDRAULIC SHOCK ABSORBER

BACKGROUND OF THE INVENTION

The present invention relates to a hydraulic shock absorber suitable for use to damp or buffer vibrations of a vehicle, for example, an automobile.

In general, a hydraulic shock absorber has an outer cylinder, one end of which is closed, and which has an annular cover member provided at another end thereof. An inner cylinder is provided in the outer cylinder to form an annular reservoir chamber between itself and the outer cylinder. A piston rod is inserted at one end thereof into the inner cylinder. Another end of the piston rod extends through the cover member and projects to an exterior of the outer cylinder. A cylindrical rod guide is provided at another end of the inner cylinder to slidably guide the piston rod. A rod seal is provided on an inner periphery of the cover member in sliding contact with an outer periphery of the piston rod to seal between the piston rod and the cover member.

With the hydraulic shock absorber according to related art as described above, the one end of the outer cylinder is secured to an axle-side member of an automobile, for example, and the another end of the piston rod is secured to a body side member of the automobile. When vibrations occur during running of the automobile or on other occasions, the piston rod extends and retracts to cause hydraulic fluid to flow between a rod-side hydraulic fluid chamber and a bottom-side hydraulic fluid chamber that are formed in the inner cylinder, thereby generating damping force through a damping force generating mechanism including disk valves so as to damp the vibrations of the automobile.

In the related art, when the piston rod retracts or extends, a volumetric capacity of the inner cylinder changes by an amount corresponding to an amount by which the piston rod enters or withdraws from the inner cylinder. At this time, therefore, hydraulic fluid in the inner cylinder is allowed to flow out into the reservoir chamber, or hydraulic fluid in the reservoir chamber is allowed to flow into the inner cylinder. In addition, a gas sealed in the reservoir chamber is compressed or expanded by action of hydraulic fluid flowing into or out of the reservoir chamber. In this way, such a volumetric change in the inner cylinder is absorbed.

Further, in the related art, a hydraulic fluid reservoir chamber is provided between the rod seal and the rod guide. In addition, a lip seal is integrally provided on an outer periphery of the rod seal. The lip seal is located between the reservoir chamber and the hydraulic fluid reservoir chamber to serve as a check valve. The lip seal separably abuts the rod guide to allow hydraulic fluid in the hydraulic fluid reservoir chamber to flow toward the reservoir chamber, and to block flow of hydraulic fluid in a reverse direction.

Accordingly, when the rod-side hydraulic fluid chamber is brought into a high-pressure state during extension of the piston rod, hydraulic fluid in the hydraulic fluid chamber leaks into the hydraulic fluid reservoir chamber through a gap between the piston rod and the rod guide. As a result, an excess of hydraulic fluid, due to leakage thereof into the hydraulic fluid reservoir chamber, causes the lip seal to open and flows therethrough to return to the reservoir chamber. Thus, pressure of hydraulic fluid in the hydraulic fluid reservoir chamber is kept from increasing excessively to prevent an excess load from acting on the lip seal.

During assembly of a hydraulic shock absorber, air enters the inner cylinder undesirably. If the hydraulic shock absorber is used in this state, damping force characteristics obtained with the disk valves degrade. Therefore, in advance of shipment of products or on other occasions, an operator performs an air removing operation to discharge air, in the inner cylinder, into the reservoir chamber, thereby preventing degradation of quality of the products.

More specifically, during the air removing operation, the piston rod is caused to extend and retract a plurality of times, thereby releasing air, in the inner cylinder, into the hydraulic fluid reservoir chamber through the gap between the piston rod and the rod guide. The released air opens the lip seal and is discharged into the reservoir chamber through the lip seal.

Incidentally, with the above-described related art, if interference of the lip seal abutting the valve seat surface of the rod guide is reduced so as to set a valve opening pressure of the lip seal at a lower level, hydraulic fluid and air leaking into the hydraulic fluid reservoir chamber can be returned to the reservoir chamber smoothly.

However, if a valve opening pressure is reduced simply by reducing a thickness of the lip seal, some problems arise. That is, the rod seal itself, or a member provided around the rod seal (e.g. the rod guide), needs to be produced with some dimensional tolerances. Therefore, if the dimensional tolerances of these members are large, when the hydraulic shock absorber is assembled, the lip seal, which is integral with the rod seal, may strongly abut the rod guide at an entire surface thereof, causing interference of the lip seal to become larger than is needed.

In such a case, as interference of the lip seal increases, a valve opening pressure increases. Consequently, removability of air from the inner cylinder degrades. In addition, variations in interference of the lip seal due to dimensional tolerances of the rod seal and the like make it difficult to keep a valve opening pressure of the lip seal small and uniform among products.

In the related art, further, the rod seal having the lip seal is integrally secured to the cover member, and the cover member is secured to the another end of the outer cylinder by bending the another end of the outer cylinder against the cover member. Therefore, interference of the lip seal varies also with bending pressure applied to the cover member when secured to the another end of the outer cylinder. Accordingly, it is difficult to make a valve opening pressure of the lip seal uniform among products.

The present invention was made in view of the above-described problems with the related art, and an object of the present invention is to provide a hydraulic shock absorber designed so that a valve opening pressure of a lip seal can be kept small irrespective of size of the interference of the lip seal, and it is possible to minimize variations in valve opening pressure of the lip seal among products and to improve air removability.

SUMMARY OF THE INVENTION

To solve the above-described problem, the present invention provides a hydraulic shock absorber including an outer cylinder, one end of which is closed, and which has an annular cover member provided at another end thereof. An inner cylinder is provided in the outer cylinder to form an annular reservoir chamber between itself and the outer cylinder. A piston rod is inserted at one end thereof into the inner cylinder. Another end of the piston rod extends through the cover member and projects to an exterior of the outer cylinder. A cylindrical rod guide is provided at one end of the inner cylinder to slidably guide the piston rod. A rod seal is provided at an inner periphery of the cover member in sliding contact with an outer periphery of the piston rod to seal between the piston rod and the cover member. A hydraulic fluid reservoir chamber is formed between the rod seal and the rod guide to accommodate hydraulic fluid leaking out of the inner cylinder through the rod guide. A check valve is provided between the reservoir chamber and the hydraulic fluid reservoir chamber. The check valve is separably seated on the rod guide to allow hydraulic fluid in the hydraulic fluid reservoir chamber to flow toward the reservoir chamber, and to block flow of hydraulic fluid in a reverse direction. The check valve has a hydraulic fluid groove for guiding hydraulic fluid from the hydraulic fluid reservoir chamber to an outer peripheral portion of the check valve. Preferably, the check valve is formed from a lip seal having an annular lip portion integrally formed on an outer periphery of the rod seal and extending radially outwardly. The annular lip portion is separably seated on the rod guide. Preferably the annular lip portion of the lip seal is formed with the above-described hydraulic fluid groove extending from a radially inner side toward a radially outer side along one side surface of the lip seal that faces the hydraulic fluid reservoir chamber.

In one embodiment of the present invention, the annular lip portion of the lip seal serving as the check valve is provided with the hydraulic fluid groove extending from the radially inner side toward the radially outer side along the one side surface of the lip seal that faces the hydraulic fluid reservoir chamber, so that hydraulic fluid in the hydraulic fluid reservoir chamber can be guided to an exterior of the hydraulic fluid groove provided on the annular lip portion of the lip seal. Accordingly, even when there is an increase in interference of the annular lip portion abutting the rod guide when the lip seal is installed, passage of the hydraulic fluid groove is ensured. Therefore, only an outer portion of the annular lip portion opens, and a valve opening pressure of the lip seal can be set at a low level.

DETAILED DESCRIPTION OF THE PREFERRED EMBODIMENTS

A hydraulic shock absorber according to an embodiment of the present invention will be described below in detail with reference to the accompanying drawings.

Figure 1:
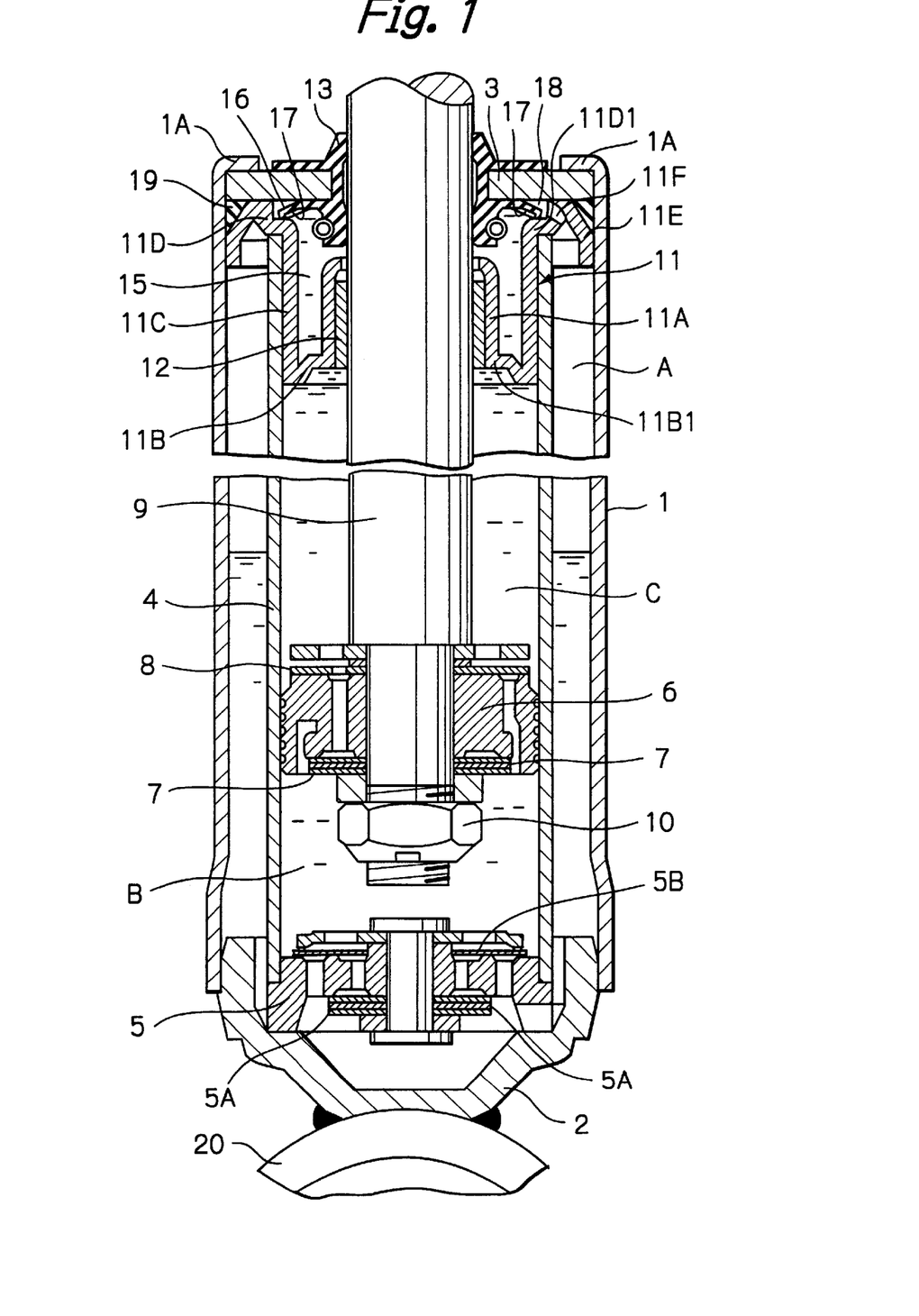
FIG. 1 is a vertical sectional view of a hydraulic shock absorber according to an embodiment of the present invention.

In the figures, reference numeral 1 denotes an outer cylinder, one end of which is closed. The outer cylinder 1 constitutes a body of a hydraulic shock absorber. A lower end of the outer cylinder 1, which is defined as one end thereof, is closed with a bottom cap 2. An upper end of the outer cylinder 1, which is defined as another end thereof, is formed with a plurality of bent portions 1A (only two of which are shown). An annular cover plate 3 is provided at the upper end of the outer cylinder 1 as a cover member. The cover plate 3 abuts a rod guide 11 (described later) and is secured with the bent portions 1A in this state.

Reference numeral 4 denotes an inner cylinder coaxially provided in the outer cylinder 1. A lower end of the inner cylinder 4 is fitted to an outer periphery of a bottom valve 5 (described later). The inner cylinder 4 defines an annular reservoir chamber A between itself and the outer cylinder 1. A hydraulic fluid and a gas are sealed in the reservoir chamber A.

The bottom valve 5 is provided between the bottom cap 2 and the lower end of the inner cylinder 4. The bottom valve 5 has disk valves 5A and a check valve 5B. The bottom valve 5 operates as follows. When a piston rod 9 (described later) extends, the disk valves 5A are closed, whereas the check valve 5B opens to allow hydraulic fluid in the reservoir chamber A to flow into a bottom-side hydraulic fluid chamber B (described later).

When the piston rod 9 retracts, the bottom valve 5 operates as follows. The check valve 5B is closed, whereas the disk valves 5A open to allow the hydraulic fluid in the bottom-side hydraulic fluid chamber B to flow into the reservoir chamber A. At this time, the disk valves 5A provide resistance to flow of hydraulic fluid to generate damping force.

Reference numeral 6 denotes a piston slidably fitted in the inner cylinder 4. The piston 6 divides an interior of the inner cylinder 4 into the bottom-side hydraulic fluid chamber B and a rod-side hydraulic fluid chamber C. The piston 6 is provided with extension-side disk valves 7 and a compression-side disk valve 8. The disk valves 7 open when the piston rod 9 extends. The disk valve 8 opens when the piston rod 9 retracts. Thus, the disk valves 7 and 8 allow the hydraulic fluid to flow between the bottom-side hydraulic fluid chamber B and the rod-side hydraulic fluid chamber C, thereby generating damping force.

The piston rod 9 has its lower end inserted in the inner cylinder 4 and secured to an inner periphery of the piston 6 with a nut 10. An upper end of the piston rod 9 extends through the rod guide 11 (described later) and the cover plate 3 and projects to an exterior of the inner cylinder 4 and outer cylinder 1.

Figure 2:
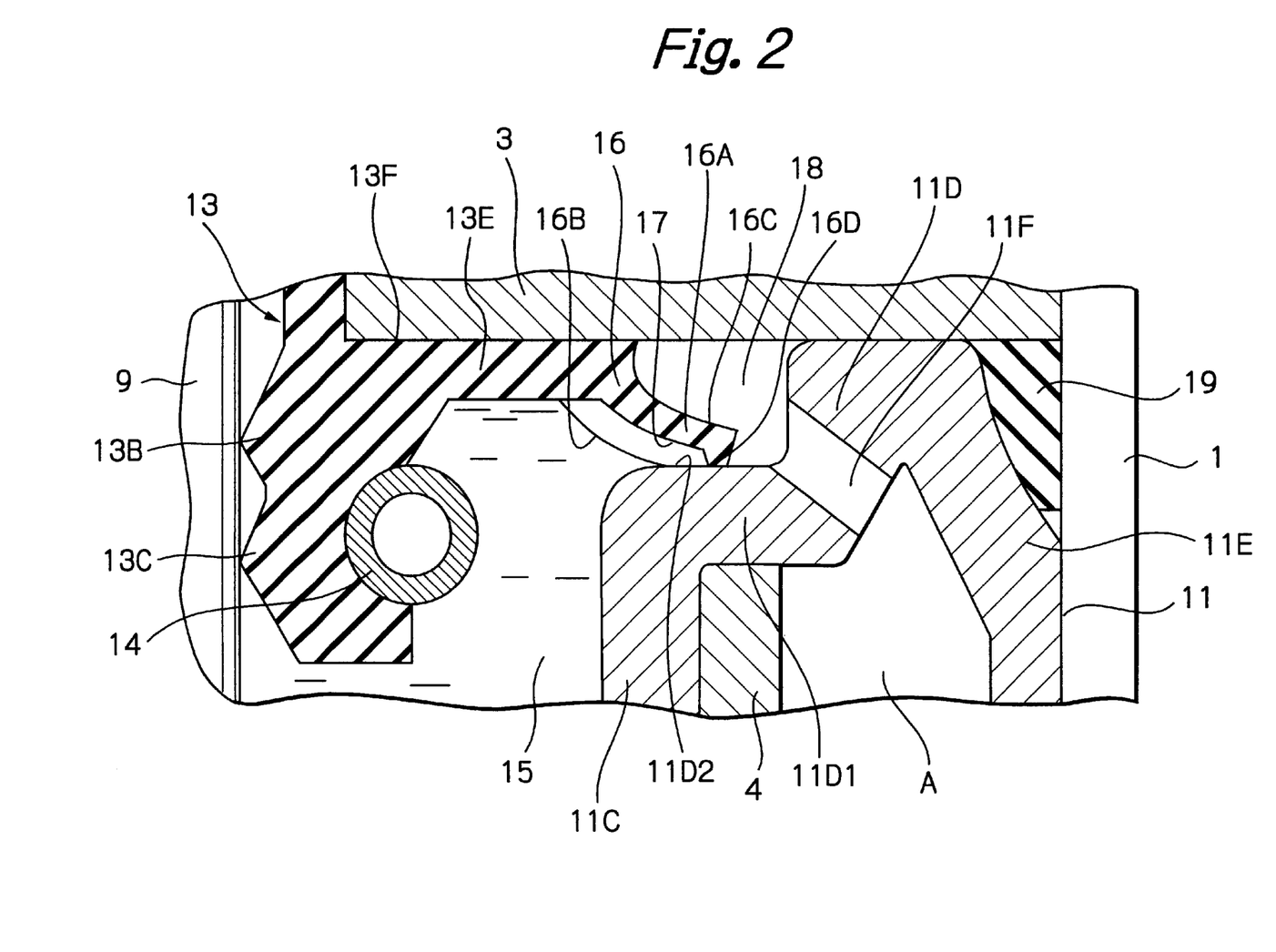
FIG. 2 is a fragmentary enlarged sectional view showing a rod guide, a rod seal, and a lip seal in FIG. 1.

The rod guide 11 is provided at an upper end of the inner cylinder 4. As shown in FIGS. 1 and 2, the rod guide 11 is formed as a triple-wall cylinder by press-forming a single steel plate or the like.

The rod guide 11 comprises an inner cylindrical portion 11A loosely fitted to an outer periphery of the piston rod 9; an inner stepped expanded portion 11B connected to a lower end of the inner cylindrical portion 11A through a step portion 11B1; an intermediate cylindrical portion 11C extending upwardly from a lower end of the stepped expanded portion 11B; an outer stepped expanded portion 11D connected to an upper end of the intermediate cylindrical portion 11C through a step portion 11D; and an outer cylindrical portion 11E extending obliquely downwardly from the stepped expanded portion 11D and having an intermediate portion bent in the shape of the symbol "<" or ">".

Regarding the rod guide 11, as shown in FIG. 2, a top surface of the step portion 11D1 is formed from a smooth surface as an annular valve seat surface 11D2. A lip seal 16 (described later) abuts the valve seat surface 11D2. Further, the stepped expanded portion 11D of the rod guide 11 is provided with a plurality of circumferentially spaced communicating holes 11F (only one of which is shown). The communicating holes 11F provide communication between the reservoir chamber A and an annular space 18 (described later).

The rod guide 11 is installed as follows. The step portion 11D1 is placed to abut the upper end of the inner cylinder 4, and in this state, the intermediate cylindrical portion 11C and the outer cylindrical portion 11E are press-fitted to respective inner peripheries of the inner and outer cylinders 4 and 1. In addition, a cylindrical guide seal 12 made of a resin material or the like is fitted to an inner periphery of the inner cylindrical portion 11A of the rod guide 11. The rod guide 11 has the guide seal 12 brought into sliding contact with an outer periphery of the piston rod 9, thereby slidably guiding the piston rod 9 in an axial direction.

Figure 3:
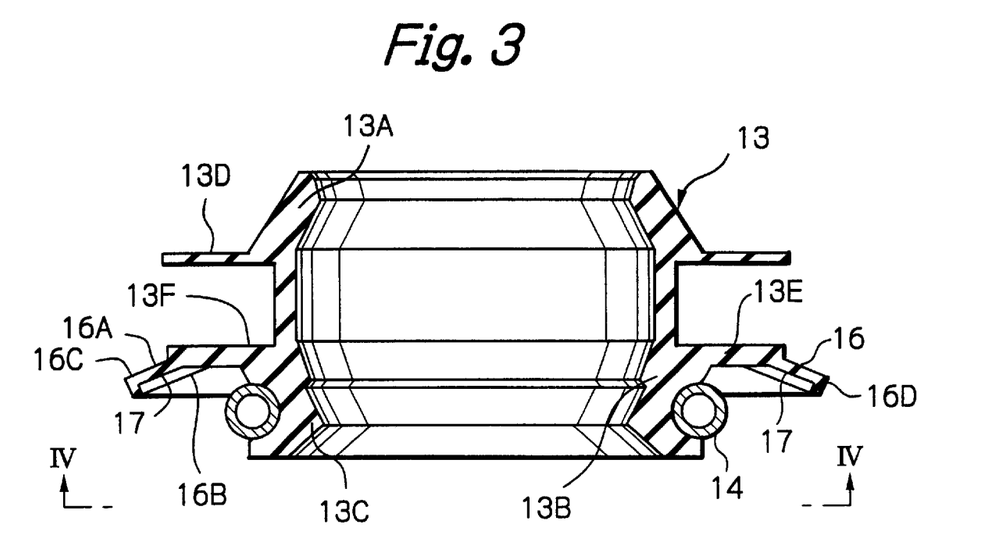
FIG. 3 is an enlarged sectional view showing the rod seal and the lip seal in FIG. 1 as a single unit.

Reference numeral 13 denotes a rod seal provided on an inner periphery of the cover plate 3. The rod seal 13 is formed into a cylindrical shape from an elastic material, e.g. rubber. An upper lip portion 13A is provided on an inner periphery of an upper end of the rod seal 13. An inner periphery of a lower end of the rod seal 13 is provided with a pair of lower lip portions 13B and 13C spaced apart from each other in the vertical direction.

Further, vertically spaced annular plate portions 13D and 13E are integrally formed on an outer periphery of the rod seal 13. The space between the annular plate portions 13D and 13E forms an annular mounting recess 13F. With an inner periphery of the cover plate 3 fitted into the mounting recess 13F, the rod seal 13 is secured thereto by welding or bonding. It should be noted that the annular plate portion 13E of the rod seal 13 corresponds to a base portion and constitutes a part of a lip seal 16 (described later). A lip portion 16A (described later) is integrally formed on an outer periphery of the annular plate portion or base portion 13E.

The rod seal 13 has the upper lip portion 13A brought into sliding contact with the outer periphery of the piston rod 9 with interference, and the lower lip portions 13B and 13C are brought into sliding contact with the outer periphery of the piston rod 9 with interference by a ring-shaped coil spring 14, thereby sealing between the piston rod 9 and the cover plate 3 in a fluid-tight and gas-tight manner. Reference numeral 15 denotes a hydraulic fluid reservoir chamber provided between the rod guide 11 and the rod seal 13. The hydraulic fluid reservoir chamber 15 is formed as an annular space between the piston rod 9, the rod guide 11, the rod seal 13 and the lip seal 16. When hydraulic fluid in the rod-side hydraulic fluid chamber C, or air mixed in the hydraulic fluid, leaks out through a slight gap between the piston rod 9 and the guide seal 12, the hydraulic fluid reservoir chamber 15 accommodates the leaked hydraulic fluid or air.

Reference numeral 16 denotes a lip seal provided on the outer periphery of the rod seal 13 as a check valve. The lip seal 16 is formed together with the rod seal 13 by integral molding. The lip seal 16 is preferably formed from an elastic material, e.g. rubber. The lip seal 16 comprises the annular plate portion or base portion 13E integrally formed on the outer periphery of the rod seal 13 and the annular lip portion 16A. A proximal end of the annular lip portion 16A is integrally formed on the outer periphery of the annular plate portion 13E. A distal end or peripheral portion of the lip portion 16A extends obliquely downwardly at a radially outer side thereof. The lip portion 16A of the lip seal 16 has one side surface 16B facing the hydraulic fluid reservoir chamber 15 and another side surface 16C facing the annular space 18 (described later). The one side surface 16B is provided with hydraulic fluid grooves 17 (described later).

Further, the distal end of the lip portion 16A of the lip seal 16 has an end portion or terminal portion located at an outer peripheral end thereof. This end portion extends downwardly as viewed in the figures from the outer peripheral end. In this embodiment, the end portion of the distal end of the lip portion 16A forms an annular valve portion 16D that abuts the valve seat surface 11D2 of the rod guide 11 with interference. The valve portion 16D is adapted to separate from or rest on the valve seat surface 11D2 in accordance with pressure of hydraulic fluid or air in the hydraulic fluid reservoir chamber 15 that acts between the valve seat surface 11D2 of the rod guide 11 and the one side surface 16B.

The lip seal 16 allows hydraulic fluid in the hydraulic fluid reservoir chamber 15 to flow into the reservoir chamber A through the annular space 18 and the communicating holes 11F of the rod guide 11, and blocks flow of hydraulic fluid in a reverse direction.

Figure 4:
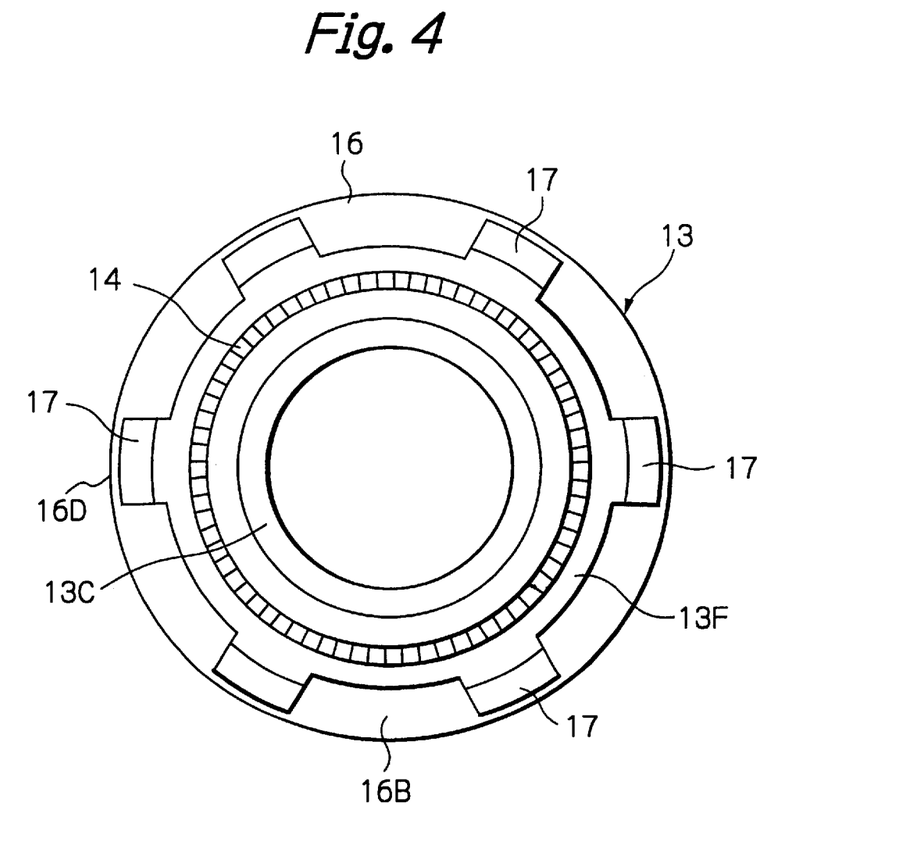
FIG. 4 is a bottom view of the rod seal and the lip seal as seen from a direction of arrow IV—IV in FIG. 3.

Reference numeral 17 denotes hydraulic fluid grooves provided on the lip portion 16A of the lip seal 16 apart from each other in a circumferential direction. The number of hydraulic fluid grooves is preferably six by way of example. The hydraulic fluid grooves 17 are formed by cutting the one side surface 16B of the lip seal 16 to provide approximately rectangular notches extending from a radially inner side toward the radially outer side along the one side surface 16B.

Further, the hydraulic fluid grooves 17 are arranged on the one side surface 16B of the lip seal 16 at approximately equal intervals in a circumferential direction to extend radially. Furthermore, the hydraulic fluid grooves 17 are located radially inside the valve portion 16D of the lip portion 16A of the lip seal 16.

As shown in FIG. 2, the hydraulic fluid grooves 17 are formed by locally reducing a wall thickness of the lip portion 16A to guide hydraulic fluid to the valve portion 16D through passages formed between the hydraulic fluid grooves 17 and the valve seat surface 11D2 of the rod guide 11. Thus, only the valve portion 16D opens, and it is consequently possible to set the valve opening pressure of the lip seal 16 as a check valve at a low level.

Reference numeral 18 denotes the annular space formed between the cover plate 3, the rod guide 11 and the lip seal 16. A seal ring 19 is secured to an outer periphery of the cover plate 3. The seal ring 19 prevents hydraulic fluid and gas in the reservoir chamber A from leaking to an exterior of outer cylinder 1 through a joint between the outer cylinder 1 and the cover plate 3.

The hydraulic shock absorber according to this embodiment has the above-described structure. The upper end of the piston rod 9 is secured to a body-side member of an automobile through a mount rubber (not shown). A lower end of the outer cylinder 1 is secured to an axle-side member of the automobile through a mounting eye 20. When vibrations occur during running of the automobile or on other occasions, the hydraulic shock absorber allows the piston rod 9 to extend and retract, and while doing so, generates damping force through the disk valves 7 and 8 to damp the vibrations.

More specifically, during an extension stroke of the piston rod 9, an interior of the rod-side hydraulic fluid chamber C is placed under high pressure. Therefore, hydraulic fluid in the hydraulic fluid chamber C flows out into the bottom-side hydraulic fluid chamber B through the disk valves 7, causing damping force to be generated. At this time, an amount of hydraulic fluid corresponding to a volumetric capacity of a portion of the piston rod 9 protruded from the inner cylinder 4 flows out of the reservoir chamber A and enters the bottom-side hydraulic fluid chamber B through the check valve 5B constituting the bottom valve 5. In addition, pressure of gas in the reservoir chamber A is reduced, thereby absorbing a volumetric change corresponding to a volumetric capacity of a portion of the piston rod 9 by which it has withdrawn from the inner cylinder 4.

At this time, because pressure in the rod-side hydraulic fluid chamber C is increased, hydraulic fluid in the hydraulic fluid chamber C may leak into the hydraulic fluid reservoir chamber 15 through a slight gap between the piston rod 9 and the guide seal 12, for example. In such a case, an excess of hydraulic fluid resulting from leakage of hydraulic fluid into the hydraulic fluid reservoir chamber 15 causes the lip seal 16 to separate from the valve seat surface 11D2 of the rod guide 11 and flows into the annular space 18 to return to the reservoir chamber A through the communicating holes 11F. During a retraction stroke of the piston rod 9, the bottom-side hydraulic fluid chamber B is placed under high pressure. Therefore, hydraulic fluid in the hydraulic fluid chamber B flows out into the rod-side hydraulic fluid chamber C through the disk valve 8, causing damping force to be generated. At this time, an amount of hydraulic fluid corresponding to a volumetric capacity of a portion of the piston rod 9 by which it has entered the inner cylinder 4 flows out of the bottom-side hydraulic fluid chamber B and enters the reservoir chamber A through the disk valves 5A of the bottom valve 5 to pressurize gas in the reservoir chamber A, causing the lip seal 16 to be pressed against the valve seat surface 11D2 of the rod guide 11. In addition, flow of hydraulic fluid into the reservoir chamber A absorbs volumetric change corresponding to the volumetric capacity of the portion of the piston rod 9 by which it has entered the inner cylinder 4.

Meanwhile, when air entering the inner cylinder 4 during assembly of the hydraulic shock absorber is to be discharged into the reservoir chamber A, the piston rod 9 is caused to extend and retract a plurality of times, thereby allowing air in the inner cylinder 4 to be released into the hydraulic fluid reservoir chamber 15 through the gap between the piston rod 9 and the guide seal 12. The air released into the hydraulic fluid reservoir chamber 15 causes the lip seal 16 to open. Thus, the air can be discharged into the reservoir chamber A.

Figure 5:
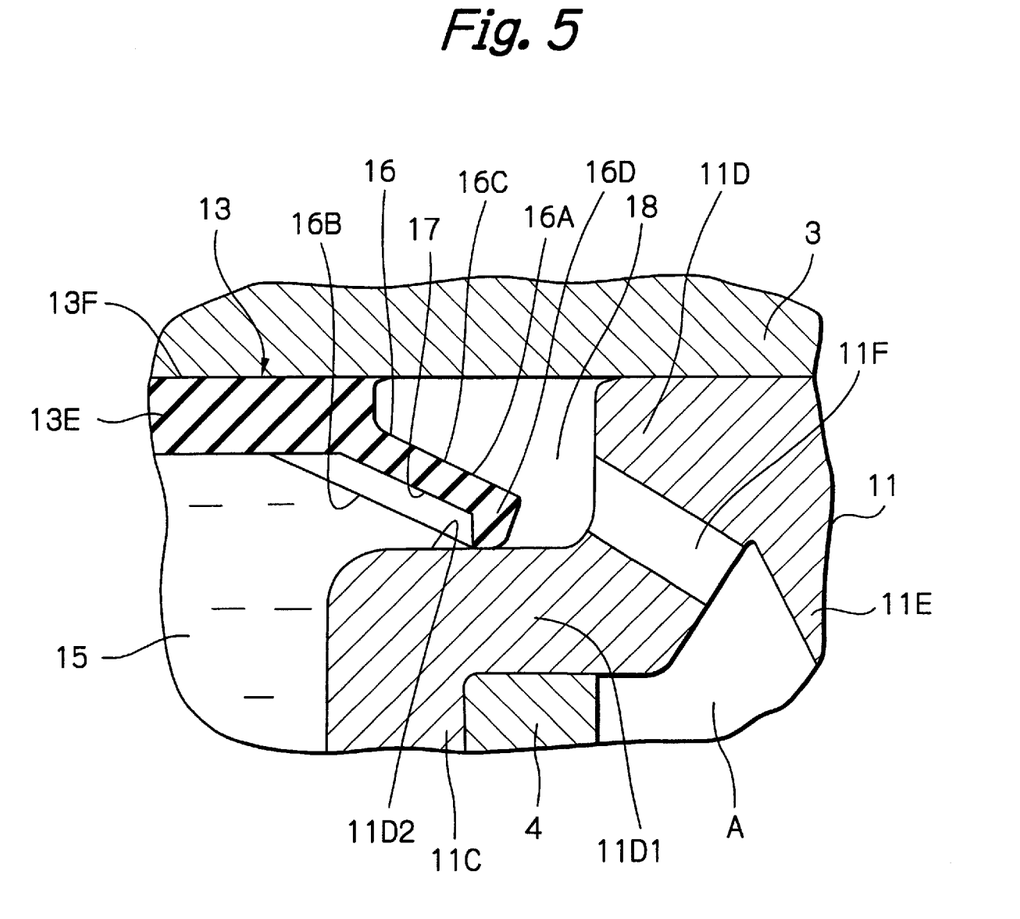
FIG. 5 is a fragmentary enlarged sectional view as seen from the same position as in FIG. 2, showing a state where interference of the lip seal is reduced.

Incidentally, if interference of the lip seal 16 abutting the valve seat surface 11D2 of the rod guide 11 is reduced to set a valve opening pressure of the lip seal 16 at a lower level as shown in FIG. 5, air released into the hydraulic fluid reservoir chamber 15 as stated above can be smoothly returned to the reservoir chamber A through the lip seal 16, and hence removability of air from the inner cylinder 4 can be improved.

However, the rod seal 13 itself, including the lip seal 16, or a member provided around the rod seal 13 (e.g. the rod guide 11) needs to be produced with some dimensional tolerances. Therefore, if the dimensional tolerances of these members are large, when the hydraulic shock absorber is assembled, the lip seal 16, which is integral with the rod seal 13, may strongly abut the rod guide 11 not only at a lower end of the valve portion 16D but also at a part of the one side surface 16B, as shown in FIG. 2, thereby causing interference of the lip seal 16 to become unfavorably large.

Therefore, the lip seal 16 used in this embodiment is arranged so that the one side surface 16B of the lip portion 16A, which faces the hydraulic fluid reservoir chamber 15, is provided with the hydraulic fluid grooves 17 extending from the radially inner side toward the radially outer side.

Thus, even when interference of the lip portion 16A abutting valve seat surface 11D2 of the rod guide 11 increases during installation of the lip seal 16, it is possible to guide hydraulic fluid from the hydraulic fluid reservoir chamber 15 to the valve portion 16D through the hydraulic fluid grooves 17 and to open only the valve portion 16D of the lip portion 16A. As a result, a valve opening pressure of the lip seal 16 can be set at a low level.

Figure 6:
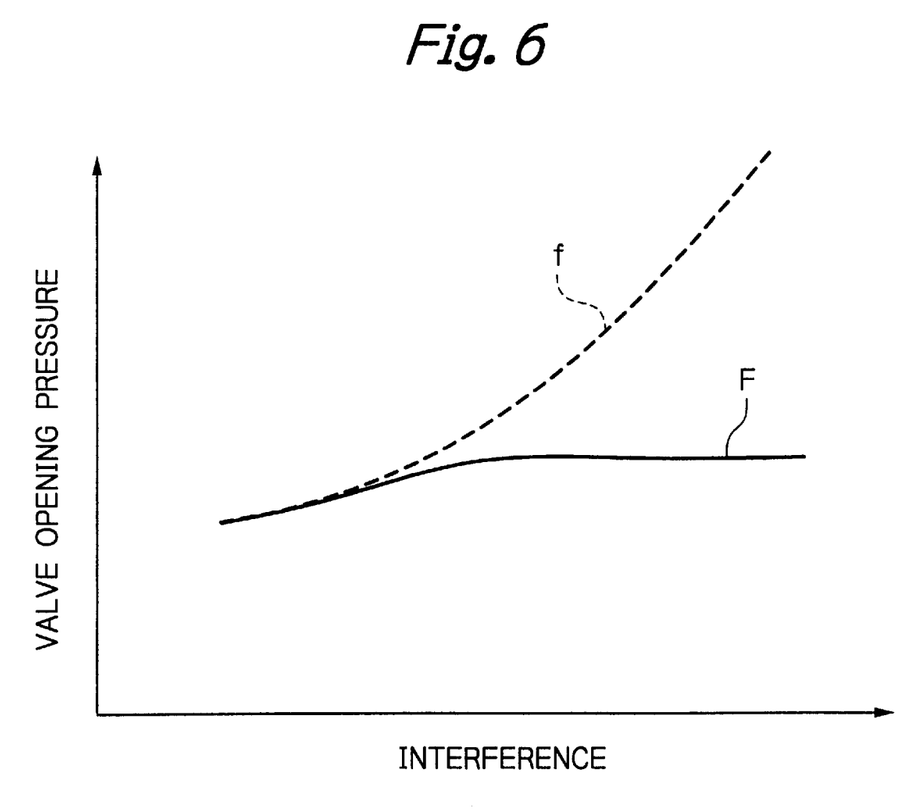
FIG. 6 is a characteristic chart showing a relationship between interference of the lip seal and a valve opening pressure thereof.

Thus, in this embodiment, a valve opening pressure of the lip seal 16 can be kept low irrespective of size of interference of the lip portion 16A as shown by the solid-line characteristic curve F in FIG. 6. Accordingly, it is possible to improve removability of air from the inner cylinder 4 through the lip seal 16, and hence possible to maintain high damping force characteristics of the disk valves 7 and 8.

Moreover, because a valve opening pressure of the lip seal 16 can be lowered as stated above, pressure of hydraulic fluid in the hydraulic fluid reservoir chamber 15 can be kept from increasing excessively when the piston rod 9 extends or retracts. Consequently, it is possible to prevent an excess load from acting on the lip seal 16 and also prevent hydraulic fluid in the hydraulic fluid reservoir chamber 15 from leaking to an exterior thereof.

Figure 7:
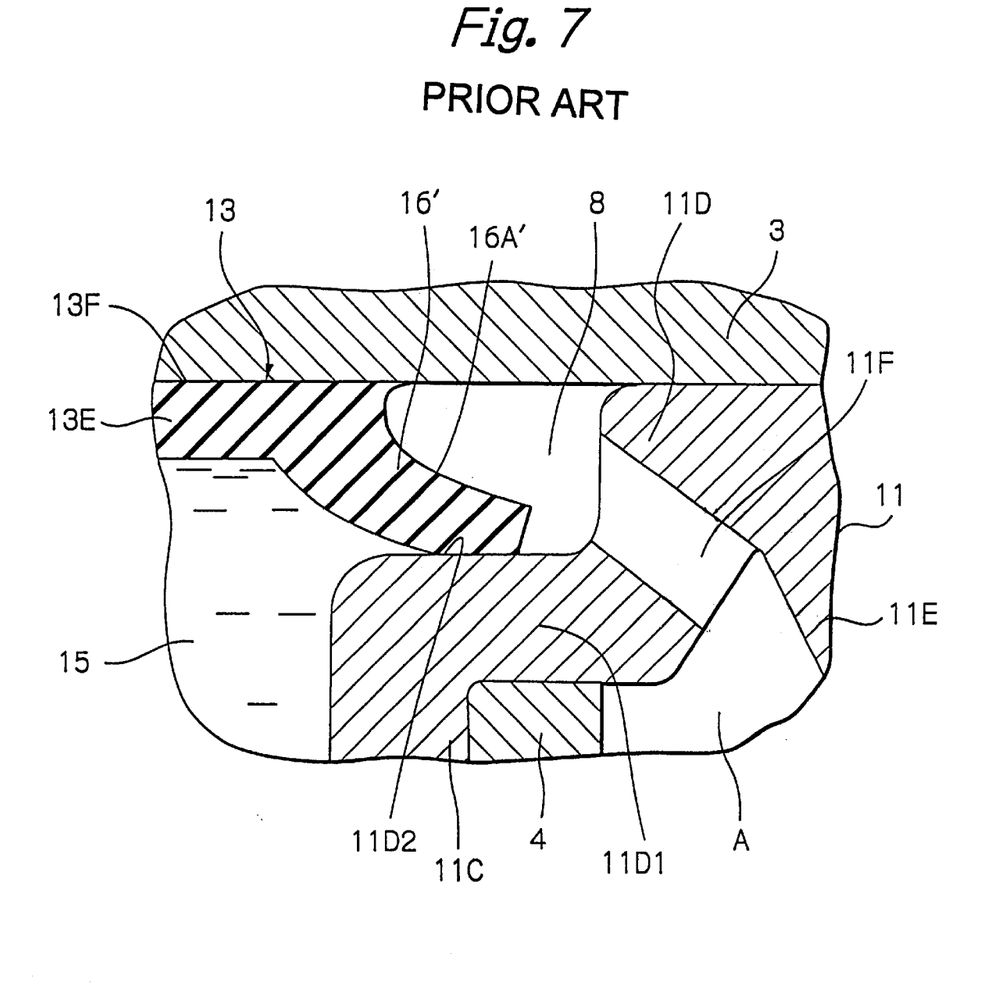
FIG. 7 is a fragmentary enlarged sectional view of a rod guide, a rod seal, and a lip seal in a comparative example as seen from the same position as in FIG. 2.

In contrast, if there are no hydraulic fluid grooves 17 in lip portion 16A' of lip seal 16' as in a comparative example shown in FIG. 7 or if stiffness or rigidity of the lip seal 16' is merely reduced (i.e. a thickness thereof is reduced), a valve opening pressure of the lip seal 16' rises as interference of the lip seal 16' increases, as shown by dofted-line characteristic curve f in FIG. 6. Consequently, removability of air through the lip seal 16' degrades.

Accordingly, with this embodiment a valve opening pressure of the lip seal 16 can be set at an approximately constant small value regardless of whether bending pressure applied through the bent portions 1A is increased or reduced when the cover plate 3, integrally provided with the rod seal 13, is secured to the outer cylinder 1 through the bent portions 1A. Thus, it is possible to reduce variations in valve opening pressure of the lip seal 16 among products, and hence possible to improve the hydraulic shock absorber with respect to performance and reliability.

In addition, because the distal end of the lip portion 16A of the lip seal 16 is arranged to serve as the valve portion 16D that abuts the valve seat surface 11D2 of the rod guide 11, and because the hydraulic fluid grooves 17 are provided radially inside the valve portion 16D, a sufficient wall thickness can be ensured for the valve portion 16D, and the valve portion 16D can be allowed to abut the valve seat surface 11D2 of the rod guide 11 stably with interference. Thus, a sealing function of the lip seal 16 serving as a check valve can be maintained at a high level.

Furthermore, because the plurality of circumferentially spaced hydraulic fluid grooves 17 is provided along the one side surface 16B of the lip seal 16, when the lip seal 16 is to be opened, the valve portion 16D can be separated from the valve seat surface 11D2 of the rod guide 11 at each of the hydraulic fluid grooves 17. Thus, the hydraulic fluid grooves 17 allow hydraulic fluid and air in the hydraulic fluid reservoir chamber 15 to be discharged into the reservoir chamber A even more smoothly. Although in the foregoing embodiment six hydraulic fluid grooves 17 are provided on the lip seal 16 by way of example, it should be noted that more or less than six hydraulic fluid grooves, for example, may be provided according to hardness of material, e.g. rubber, on an assumption that pressure in the hydraulic fluid reservoir chamber 15 is held approximately at a predetermined level (i.e. such a pressure that hydraulic fluid will not leak to the exterior of the hydraulic fluid reservoir chamber). It is also possible to provide hydraulic fluid grooves extending over an entire circumference of the lip seal 16.

Further, although in the foregoing embodiment the present invention has been described with regard to a hydraulic shock absorber for use in an automobile by way of example, the present invention is not necessarily limited thereto but may also be applied, for example, to hydraulic shock absorbers used in various machines, architectural structures, and the like that constitute vibration sources.

As has been detailed above, in the foregoing embodiment a reservoir chamber is formed between an outer cylinder and an inner cylinder, and a hydraulic fluid reservoir chamber is formed between a rod seal provided at one end of the outer cylinder and a rod guide provided at one end of the inner cylinder. A check valve is provided between the reservoir chamber and the hydraulic fluid reservoir chamber to allow only flow of hydraulic fluid from the hydraulic fluid reservoir chamber to the reservoir chamber. The check valve is constructed as a lip seal having an annular lip portion integrally formed on an outer periphery of the rod seal and separably seated on the rod guide. The annular lip portion of the lip seal is provided with hydraulic fluid grooves extending from a radially inner side toward a radially outer side along one side surface of the lip seal that faces the hydraulic fluid reservoir chamber. Therefore, even when interference of the lip portion separably seated on the rod guide is increased, hydraulic fluid in the hydraulic fluid reservoir chamber can be guided to an outer peripheral portion of the lip portion through the hydraulic fluid grooves so as to open the outer peripheral portion of the lip portion.

Thus, a valve opening pressure of the lip seal can be kept low regardless of size of interference of the lip portion. Accordingly, it is possible to improve removability of air from the inner cylinder through the lip seal, and hence possible to maintain high damping force characteristics of a hydraulic shock absorber. Further, because a valve opening pressure of the lip seal can be kept low, pressure of hydraulic fluid in the hydraulic fluid reservoir chamber can be kept from increasing excessively when a piston rod extends or retracts. Therefore, it is possible to prevent an excess load from acting on the lip seal and also prevent hydraulic fluid in the hydraulic fluid reservoir chamber from leaking to an exterior of the hydraulic fluid reservoir chamber.

The disclosure of Japanese Patent Application No. 2000-130145 filed on Apr. 28, 2000 including specification, claims, drawings and summary is incorporated herein by reference in its entirety.

What is claimed is:

1. A hydraulic shock absorber comprising:
   an outer cylinder having one end and an opposite end, said one end being closed;
   an annular cover member provided at said opposite end of said outer cylinder;
   an inner cylinder having one end associated with said one end of said outer cylinder, said inner cylinder further having an opposite end associated with said opposite end of said outer cylinder, and said inner cylinder being provided in said outer cylinder so as to form an annular reservoir chamber between said inner cylinder and said outer cylinder;
   a piston rod having one end and an opposite end, said one end of said piston rod being inserted into said inner cylinder, said opposite end of said piston rod extending through said cover member and projecting to an exterior of said outer cylinder;
   a cylindrical rod guide provided at said opposite end of said inner cylinder to slidably guide said piston rod;
   a rod seal provided at an inner periphery of said cover member in sliding contact with an outer periphery of said piston rod to seal between said piston rod and said cover member;
   a hydraulic fluid reservoir chamber formed between said rod seal and said rod guide to accommodate hydraulic fluid leaking out of said inner cylinder through said rod guide;
   a communicating hole provided in said rod guide to provide communication between said hydraulic fluid reservoir chamber and said annular reservoir chamber; and
   a check valve provided between said communicating hole and said hydraulic fluid reservoir chamber, said check valve including
   (i) a base portion,
   (ii) a peripheral portion extending obliquely outwardly from said base portion and terminating in a terminal portion that rests on a valve seat surface of said rod guide to allow hydraulic fluid in said hydraulic fluid reservoir chamber to flow toward said annular reservoir chamber through said communicating hole and to block flow of hydraulic fluid from said annular reservoir chamber toward said hydraulic fluid reservoir chamber, and
   (iii) a hydraulic fluid groove for guiding hydraulic fluid from said hydraulic fluid reservoir chamber to said terminal portion, said hydraulic fluid groove extending along said peripheral portion from said base portion to said terminal portion.

2. The hydraulic shock absorber according to claim 1, wherein said check valve has one side surface facing said hydraulic fluid reservoir chamber, with said hydraulic fluid groove being on said one side surface.

3. The hydraulic shock absorber according to claim 2, wherein said hydraulic fluid groove extends from a radially inner side of said check valve toward a radially outer side of said check valve.

4. The hydraulic shock absorber according to claim 3, wherein said check valve has at least one additional hydraulic fluid groove, with said hydraulic fluid groove and said at least one additional hydraulic fluid groove being spaced from each other in a circumferential direction.

5. The hydraulic shock absorber according to claim 4, wherein said hydraulic fluid groove and said at least one additional hydraulic fluid groove are spaced from one other at approximately equal intervals in the circumferential direction.

6. The hydraulic shock absorber according to claim 2, herein said hydraulic fluid groove has a shape of an approximately rectangular recess.

7. The hydraulic shock absorber according to claim 1, wherein said check valve comprises a lip seal integral with an outer periphery of said rod seal.

8. The hydraulic shock absorber according to claim 2, wherein said lip seal has a surface facing said hydraulic fluid reservoir chamber, with said hydraulic fluid groove being on said surface.

9. The hydraulic shock absorber according to claim 8, wherein said lip seal includes an annular plate portion integral with said outer periphery of said rod seal, and includes an annular lip portion extending radially outwardly from said annular plate portion, with said annular lip portion having a proximal end and a distal end, said proximal end of said annular lip portion being integral with an outer periphery of said annular plate portion, and with said annular plate portion of said lip seal corresponding to said base portion of said check valve.

10. The hydraulic shock absorber according to claim 9, wherein said distal end of said annular lip portion corresponds to said peripheral portion of said check valve and extends obliquely downwardly at a radially outer side of said lip seal.

11. The hydraulic shock absorber according to claim 10, wherein said annular lip portion has one side surface facing said hydraulic fluid reservoir chamber and an opposite side surface facing said cover member, with said hydraulic fluid groove being on said one side surface.

12. The hydraulic shock absorber according to claim 11, wherein said hydraulic fluid groove has a shape of a recess extending from a radially inner side of said annular lip portion toward a radially outer side of said annular lip portion, and as a result of said hydraulic fluid groove having such a shape, an end portion of said distal end of said annular lip portion corresponds to said terminal portion of said peripheral portion of said check valve and defines an annular valve portion that rests on said valve seat surface of said rod guide.

13. The hydraulic shock absorber according to claim 12, wherein said annular valve portion is capable of abutting said valve seat surface of said rod guide with interference.

14. The hydraulic shock absorber according to claim 13, wherein said check valve has at least one additional hydraulic fluid groove, with said hydraulic fluid groove and said at least one additional fluid groove being spaced from one other in a circumferential direction.

15. The hydraulic shock absorber according to claim 14, wherein said hydraulic fluid groove and said at least one additional hydraulic fluid groove are spaced from one each other at approximately equal intervals in the circumferential direction.

16. The hydraulic shock absorber according to claim 15, wherein said hydraulic fluid groove has a shape of an approximately rectangular recess.

17. The hydraulic shock absorber according to claim 1, wherein an annular space is formed between said cover member, said rod guide and said check valve, with said annular space communicating with said annular reservoir chamber via said communicating hole of said rod guide.

18. The hydraulic shock absorbers according to claim 17, wherein said check valve is movable toward said annular space according to a differential pressure between said hydraulic fluid reservoir chamber and said annular reservoir chamber.

* * * * *